Figure 1:
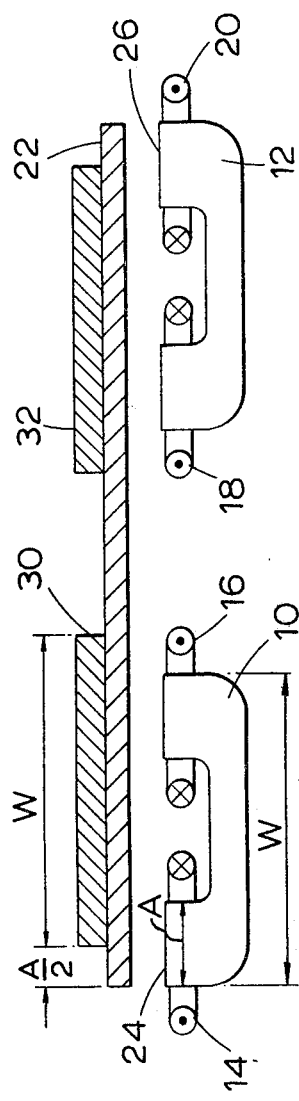

United States Patent [19]

Eastham

[11] 4,013,906
[45] Mar. 22, 1977

[54] ELECTROMAGNETIC LEVITATION
[75] Inventor: John Frederick Eastham, Aberdeen, Scotland
[73] Assignee: National Research Development Corporation, London, England
[22] Filed: May 12, 1975
[21] Appl. No.: 576,663
[30] Foreign Application Priority Data
  May 14, 1974 United Kingdom ............ 21256/74
  Oct. 19, 1974 United Kingdom ............ 46481/74
[52] U.S. Cl. .......................... 310/13; 104/148 LM; 104/148 MS
[51] Int. Cl.² ........................................ H02K 41/02
[58] Field of Search ................ 310/12–14; 104/148 R, 148 MS, 148 LM, 148 SS

[56] References Cited
UNITED STATES PATENTS

| | | | |
|---|---|---|---|
| 3,717,103 | 2/1973 | Guderjahn | 104/148 SS |
| 3,770,995 | 11/1973 | Eastham et al. | 310/13 |
| 3,836,799 | 9/1974 | Eastham et al. | 310/13 |
| 3,850,108 | 11/1974 | Winkle | 104/148 MS |

OTHER PUBLICATIONS

*IEEE Trans.,* "Traction and Normal Forces in the Linear Induction Motor" OOI & White, vol. Pas-89, No. 4, Apr. 1970, pp. 638–645.

*Primary Examiner*—Donovan F. Duggan
*Attorney, Agent, or Firm*—Cameron, Kerkam, Sutton, Stowell & Stowell

[57] ABSTRACT

In a combined linear motor and levitation arrangement, the primary comprises two longitudinally extending rows of transverse U-cores disposed side by side. The secondary comprises electrically conductive non-magnetic material backed by magnetic material. The magnetic material of the secondary is formed in two parts each of which is associated with a respective row of U-cores of the primary.

7 Claims, 2 Drawing Figures

ELECTROMAGNETIC LEVITATION

This invention relates to electrical machines of the kind which employ electromagnetic levitation.

U.S. Pat. No. 3,836,799 relates to an electrical machine having a secondary comprising electrically conductive material and a primary comprising a core of magnetic material having at least two rows of pole faces confronting said secondary and being arranged to provide paths for working flux between said rows of pole faces in planes substantially perpendicular to said rows, the secondary being arranged to provide longitudinal paths for electric current on each side of each row of pole faces and transverse paths interconnecting said longitudinal paths, the primary being arranged, when energised from a polyphase alternating current supply, to create a magnetic field operative to produce a force between said primary and said secondary having first components tending to maintain said primary and said secondary spaced apart from one another, second components tending to maintain said primary and said secondary in alignment with one another in a direction perpendicular to said rows of pole faces and third components tending to cause relative displacement between said primary and said secondary in a direction parallel to said rows of pole faces. Thus this electrical machine consists of both a linear motor and a levitation arrangement.

It is already known that the use of magnetic material in the secondary of a levitation arrangement can improve the performance. For example, in the case of a simple coil floating (with no lateral stability) above a conducting sheet secondary, it has been shown that the levitated height per unit current can, in some circumstances be increased of the conducting sheet is backed by a sheet of steel. The dimensions of the system determine whether a height increase is obtained.

It is an object of the present invention to provide a system consisting of both a linear motor and a levitation arrangement having magnetic material in the secondary without impairing the lateral stability of levitation.

According to the present invention, there is provided an electrical machine having a primary comprising a core of magnetic material having at least two pairs of rows of pole faces disposed in a common plane and arranged to provide paths for working flux between the pole faces of each row in planes substantially perpendicular to said rows, and a secondary confronting said pole faces and comprising electrically conductive material arranged to provide longitudinal paths for electric current on each side of each row of pole faces and transverse paths interconnecting said longitudinal paths, and at least one core member of magnetic material extending longitudinally of the electrically conductive material on the opposite side thereof to the primary and having its lateral edges so disposed relative to the primary that the magnetic field produced when the primary is energized from a polyphase alternating current supply is operative to produce a force between said primary and said secondary having first components tending to maintain said primary and said secondary spaced apart from one another, second components tending to maintain said primary and said secondary in alignment with one another in a lateral direction and third components tending to cause relative displacement between said primary and said secondary in a longitudinal direction.

Preferably, the magnetic material of the secondary is in contact with the electrically conductive material of the secondary over two regions, one on each side of the longitudinal centre line of the electrically conductive material, the central region of the electrically conductive material not being in contact with the magnetic material. In one form of the invention, the secondary magnetic material consists of two members, one on each side of this central region.

Figure 2:
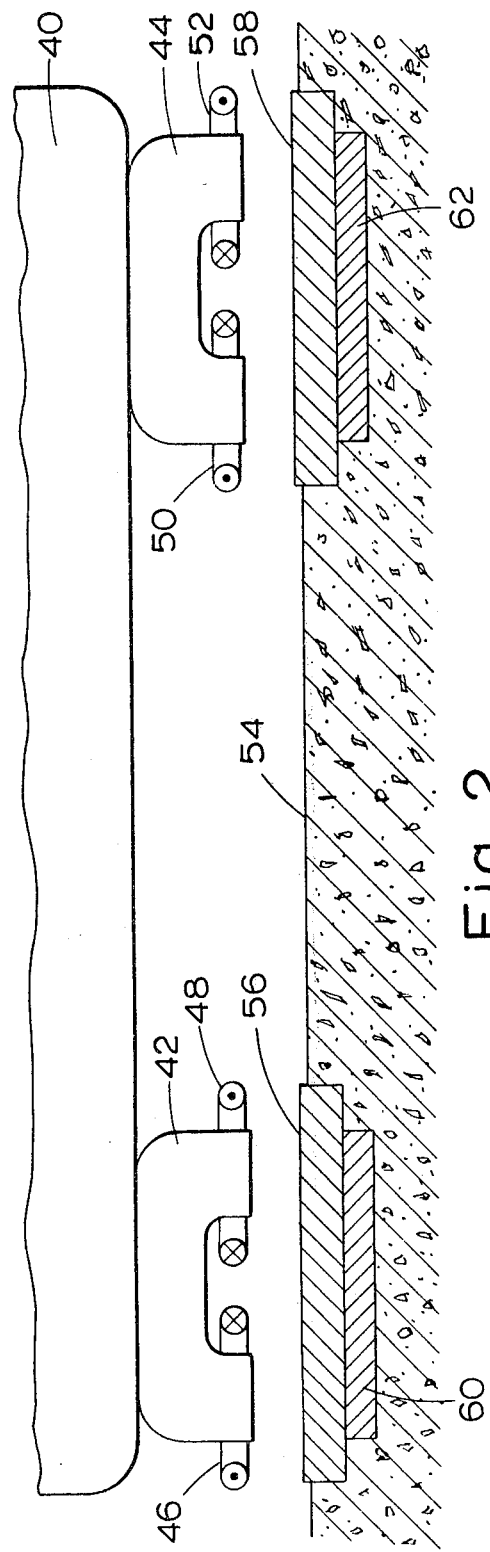

In order that the invention may be more readily understood, embodiments thereof will now be described with reference to the accompanying drawing, in which:

FIG. 1 is a lateral cross-sectional view of a first embodiment of the invention, and FIG. 2 is a part sectional, part end elevational view of a tracked ground transport system incorporating an electrical machine in accordance with a second embodiment of the invention.

Referring to FIG. 1, the primary of a levitation device in accordance with the invention comprises two longitudinally extending rows of U-shaped cores 10 and 12. Each core is oriented transversely and comprises a stack of laminations of magnetic material. Each core has a respective pair of windings such as the windings 14, 16, 18 and 20, one on each limb. The relative directions of current in the windings are as shown schematically in the drawing. Both rows of cores 10 and 12 have overall width W and have pole faces of width A as illustrated.

The secondary member comprises a sheet 22 of nonmagnetic electrically conductive material such as aluminium. The width of the sheet of aluminium is substantially equal to the overall width of the primary core structure, i.e. from the outer edge of the limb 24 of the core 10 to the outer edge of the limb 26 of the core 12. Two secondary cores 30 and 32, of unlaminated magnetic material, are disposed on the opposite side of the sheet 22 to the primary cores 10 and 12. Both cores 30 and 32 have the same width W as the primary cores 10 and 12 but they are displaced inwardly relative to the primary cores 10 and 12 by an amount not substantially greater than the width A of the pole faces. Preferably this inward displacement is by a distance ½A.

If the windings of successive U-shaped cores in each row are energized with single phase alternating current, a pure levitation effect is produced, the secondary 22 being supported above the primary and stabilized laterally in alignment therewith. If successive coils in each row are energized phases of a polyphase alternating current supply, in addition to the levitation effect produced by the single phase energization, a travelling magnetic field is produced in the longitudinal direction so that the secondary now tends to move longitudinally with respect to the primary. As before, the secondary is supported above the primary and stabilized laterally. Any of the winding configurations described in the above-mentioned U.S. patent may be used.

Alternatively, the secondary cores 30 and 32 may be symmetrically disposed with respect to the corresponding primary cores 10 and 12 but, in this case, the lateral stability is decreased somewhat.

In FIG. 2, a vehicle 40 has a primary member similar to the primary of FIG. 1 in that it comprises two sets of primary cores 42 and 44 mounted on its underside. Each set of cores comprises two longitudinally extending rows of U-shaped cores, each core being oriented transversely and comprising a stack of laminations of magnetic material. Each core has a respective pair of windings such as the windings 46, 48, 50 and 52, one on each limb. The relative directions of current in the windings are as shown schematically in the drawing.

The secondary member comprises a concrete bed 54 in which are located two sheets 56 and 58 of non-magnetic electrically conductive material such as aluminium, each aligned with a respective one of the rows of primary cores 42 and 44 and each extending the full length of the track. The width of each of the sheets 56 and 58 is somewhat larger than the width of its corresponding rows of cores 42, 44. A respective secondary core 60, 62 is disposed below each of the sheets of electrically conductive material 56 and 58 in alignment with the corresponding row of primary cores 42 and 44, and of substantially the same width as the latter.

If the windings of successive U-shaped cores in each row are energized with single phase alternating current, a pure levitation effect is produced, the vehicle 40 being supported above the track 54 and stabilized laterally in alignment therewith. If successive coils in each row are energized with successive phases of a polyphase alternating current supply, in addition to the levitation effect produced by the single phase energization, a travelling magnetic field is produced in the longitudinal direction so that the vehicle 40 now tends to move longitudinally with respect to the track 54. As before, the vehicle 40 is supported above the track 24 and stabilized laterally. Any of the winding configurations described in U.S. Pat. No. 3,836,799 may be used.

In the drawing, the secondary cores 60 and 62 are shown in alignment with the corresponding rows 42 and 44 of primary cores. If either the inner edges of the electrically conductive sheets 56 and 58 are aligned with the inner edges of the corresponding rows 42 and 44 of primary cores, or the outer edges of the sheets 56 and 58 are aligned with the outer edges of the corresponding rows 42 and 44 of primary cores 56 and 58, an increase in lateral stabilizing force is obtained. In either case, a further increase can be obtained if the secondary cores 60 and 62 are offset inwardly with respect to the corresponding sheets 56 and 58.

What is claimed is:

1. An electrical machine having a primary comprising a core of magnetic material having at least two pairs of rows of pole faces disposed in a common plane and arranged to provide paths for working flux between the pole faces of each row in planes substantially perpendicular to said rows, and a secondary confronting said pole faces and comprising electrically conductive material arranged to provide longitudinal paths for electric current on each side of each row of pole faces and transverse paths interconnecting said longitudinal paths and at least one core member of magnetic material extending longitudinally of the electrically conductive material on the opposite side thereof to the primary and having its lateral edges so disposed relative to the primary that the magnetic field produced when the primary is energised from a polyphase alternating current supply is operative to produce a force between said primary and said secondary having first components tending to maintain said primary and said secondary spaced apart from one another, second components tending to maintain said primary and said secondary in alignment with one another in a lateral direction and third components tending to cause relative displacement between said primary and said secondary in a longitudinal direction.

2. An electrical machine as claimed in claim 1, in which the primary comprises two longitudinally extending rows of U-shaped cores.

3. An electrical machine as claimed in claim 2, in which the secondary comprises a continuous sheet of electrically conductive material confronting both pairs of rows of pole faces and a respective core member of magnetic material for each row of pairs of primary pole faces.

4. An electrical machine as claimed in claim 3, in which the magnetic core members of the secondary are inwardly displaced with respect to the pairs of rows of pole faces.

5. An electrical machine as claimed in claim 2, in which the secondary comprises a respective sheet of electrically conductive material and a respective core member of magnetic material for each row of pairs of pole faces.

6. An electrical machine as claimed in claim 3, in which the width of each of the secondary core members is equal to the overall width of the corresponding pair of primary faces.

7. An electrical machine as claimed in claim 5, in which the width of each of the secondary core members is equal to the overall width of the corresponding pair of primary faces.

* * * * *